United States Patent [19]

Le Van Suu

[11] Patent Number: 5,783,757
[45] Date of Patent: Jul. 21, 1998

[54] METHODS AND APPARATUS FOR MEASURING A SPEED OF FLOW OF A FLUID

[75] Inventor: Maurice Gilbert Le Van Suu, Romainville, France

[73] Assignee: SGS-Thomson Microelectronics S.A., Saint Genis, France

[21] Appl. No.: 801,604

[22] Filed: Feb. 13, 1997

[30] Foreign Application Priority Data

Feb. 28, 1996 [FR] France ................... 96 02838

[51] Int. Cl.[6] ..................................... G01F 1/68
[52] U.S. Cl. ........................ 73/204.27; 73/204.19
[58] Field of Search ............. 73/118.2, 204.14, 73/204.17, 204.19, 204.23, 204.24, 204.25, 204.27

[56] References Cited

U.S. PATENT DOCUMENTS

| | | | |
|---|---|---|---|
| 3,905,230 | 9/1975 | Calvet et al. | 73/204 |
| 4,043,196 | 8/1977 | Trageser | 73/204 |
| 4,450,719 | 5/1984 | Nishimura et al. | 73/204.17 |
| 4,753,111 | 6/1988 | Caron et al. | 73/204.14 |
| 4,848,147 | 7/1989 | Bailey et al. | 73/204.17 |
| 5,117,691 | 6/1992 | Fraser | 73/204.15 |
| 5,186,150 | 2/1993 | Sekine | 123/494 |
| 5,207,094 | 5/1993 | Gmelin et al. | 73/118.2 |
| 5,419,187 | 5/1995 | Uchiyama | 73/118.2 |
| 5,457,626 | 10/1995 | Wolze | 364/152 |
| 5,493,100 | 2/1996 | Renger | 73/204.14 |

FOREIGN PATENT DOCUMENTS 0 698 786 A1  2/1996  European Pat. Off. ....... G01N 27/18

*Primary Examiner*—George M. Dombroske
*Assistant Examiner*—Eric S. McCall
*Attorney, Agent, or Firm*—Wolf, Greenfield & Sacks, P.C.

[57] ABSTRACT

A method of and apparatus for measuring a fluid flow speed using a current controlled heat sensor. A first signal is extracted from the heat sensor for a first value of current. The value of the current flowing through the heat sensor is modified and, from the same thermal sensor, a second signal is extracted for a second value of current. These signals are then processed by a fuzzy logic microprocessor to obtain a value of the speed of flow of the fluid.

23 Claims, 2 Drawing Sheets

IF S1∈ f₁ AND S2∈ g₁     THEN T∈ h₁
IF S1∈ f₁ AND S2∈ g₂     THEN T∈ h₁

— — — — — — — — — — — — — — —

IF S1∈ f₂ AND S2∈ g₂     THEN T∈ h₂

— — — — — — — — — — — — — — —

IF S1∈ fₙ AND S2∈ gₙ     THEN T∈ hₙ

METHODS AND APPARATUS FOR MEASURING A SPEED OF FLOW OF A FLUID

BACKGROUND OF THE INVENTION

1. Field of the Invention

The invention relates to the field of fluid mechanics, and more particularly to methods and apparatus for measuring a speed of flow of a fluid. The invention can be applied in devices for regulating the flow rate of a fluid.

2. Discussion of the Related Art

The description of a flow of fluid is highly complex and requires knowledge, at a given point, of the speed, density and temperature of the fluid. A set of sensors is used to acquire this data and the choice of these sensors generally depends on the nature of the fluid, i.e., whether the fluid is liquid or gaseous.

A conventional method of measuring the speed of flow of a fluid uses a heating element. This method is described in Donald G. Fink and Donald Christiansen, "Electronics Engineer's Handbook" (3rd edition), McGraw-Hill, page 10.16. A sensor of the thermistor type is heated by Joule effect to a temperature greater than the temperature of the fluid. This sensor is permanently in contact with the fluid in motion. A transfer of heat then takes place by convection between the fluid and the sensor. The transfer of heat depends on several parameters such as the speed of flow of the fluid and the difference in temperature between the fluid and the sensor. Indeed, the rate of heat exchange increases as the speed of flow of the fluid increases. Similarly, the rate of heat exchange increases as the difference in temperature between the fluid and the sensor increases. Assuming that the thermal conductance of the fluid is known, the conventional method needs two sensors to compute the speed of flow of the fluid: one sensor to measure the temperature of the fluid and one sensor to measure the cooling of the thermistor caused by the flow of the fluid. Conventionally, the sensors are placed on the periphery of a tube in which the flow of the fluid takes place.

However, the presence of these sensors may modify the flow of the fluid, especially if the sensors are large. Furthermore, any disturbance caused by one of the sensors may subsequently falsify the measurement made by the other sensor.

A conventional method used to compute the speed of flow of the fluid consists in setting up a mathematical model of a transfer function of the speed of flow of the fluid as a function of the information coming from the sensors. When the system formed by the tube and the fluid shows a drift, corrective terms have to be added to the transfer function, making it more complex. Thus, if the nature of the fluid or the shape of the tube enabling the flow of the fluid are changed, it may become necessary to modify the transfer function. Furthermore, the mathematical expression of the transfer function may swiftly become highly complex since the behavior of the heat sensors generally is not linear. All these adjustments to be made to the mathematical expression of the transfer function are not suited to mass production where it is important to limit the number of times when the measuring devices being manufactured undergo intervention.

SUMMARY OF THE INVENTION

An embodiment of the invention is directed to a method for enabling the use of a single sensor for the measurement of the speed of flow of a fluid.

Another embodiment of the invention is directed to a method for measuring a speed of flow of a fluid resorting to a mathematical formulation that is cumbersome and difficult to define.

Another embodiment of the invention is directed to a method for measuring a speed of flow of a fluid by means of a heat sensor placed in the flow and crossed by a current that carries the sensor to a temperature greater than the temperature of the fluid. The method includes the steps of:

a) extracting a first signal from the heat sensor, this first signal representing the exchange of heat between the heat sensor and the fluid for a first value of current flowing through the sensor;

b) making the current that flows through the sensor vary from the first value to a second value;

c) extracting a second signal from the heat sensor, this second signal representing the exchange of heat between the heat sensor and the fluid for the second value of current flowing through the sensor;

d) determining the speed of flow of the fluid based on the first and second signals.

In this way, the heat sensor is used in configurations of measurement that differ according to the value of the current flowing through it. By modifying the value of the current, a modification is thus obtained in the power dissipated in the fluid by Joule effect and therefore in the temperature of the sensor.

In step d, the speed of flow is deduced from the following relationship:

$$R(T)*I^2 = H*S*(T-T_f)$$

where

R(T) is the resistance of the heat sensor,

I is the current flowing through the heat sensor,

H is the coefficient of heat exchange,

S is the surface area of the heat sensor in contact with the fluid,

T is the temperature of the heat sensor,

T is the temperature of the fluid.

According to King's formula, $H = A + B\sqrt{u}$, where A and B are constants defined for a given fluid and a given sensor and u is the speed of flow of the fluid. The constants A and B can be quickly determined by those skilled in the art.

By performing two measurements with two distinct current values, it is possible to deduce the value of the two unknown quantities, namely the temperature $T_f$ and the speed of the fluid u.

Depending on the nature of the fluid measured, the sensors, although they function on the same principle, are not identical from a technical point of view. In the case of gases, the heat sensor is a very thin platinum or tungsten wire. The diameter of the wire ranges from 0.6 to 10 µm. In the case of liquids, the heat sensor is a thin film of platinum placed on a support, i.e., an insulating cone or cylinder.

According to an embodiment of the invention, a fuzzy logic microprocessor performs the step of determining the speed of flow of the fluid based on the signals coming from the heat sensor. Fuzzy logic makes it possible to take into account all of the characteristics of the system consisting of the sensor-equipped tube and the fluid, and to set up a perfect model of the behavior of the system. The model-making is done by direct measurement of the signals coming from the sensor for a given flow. To determine the speed of flow of the fluid, the following steps are then performed:

a first set and a second set of membership functions are defined on the dynamic range between the first and second signals by determining, for each membership function, a zone of this dynamic range and a coefficient of membership of each value of these signals in this zone, membership functions of a result signal corresponding to the speed of flow of the fluid are determined with, for each membership function of the result signal, a zone of the dynamic range of this result signal and a coefficient of membership of each value of this result signal in this zone, rules are established setting up a correlation between, firstly, the membership values of the first and second signal respectively in zones of the first and second set of membership functions and, secondly, the membership of the result signal in zones of the result signal, and for each rule, a membership value is computed, the membership value is multiplied by the mean value of the zone of the membership function of the result signal corresponding to this rule, and the mean of the results of this multiplication is taken to produce the value of the speed of flow of the fluid.

BRIEF DESCRIPTION OF THE DRAWINGS

Other features and advantages of the invention shall appear from the following detailed description made with reference to the appended figures, of which.

DETAILED DESCRIPTION

Figure 1:
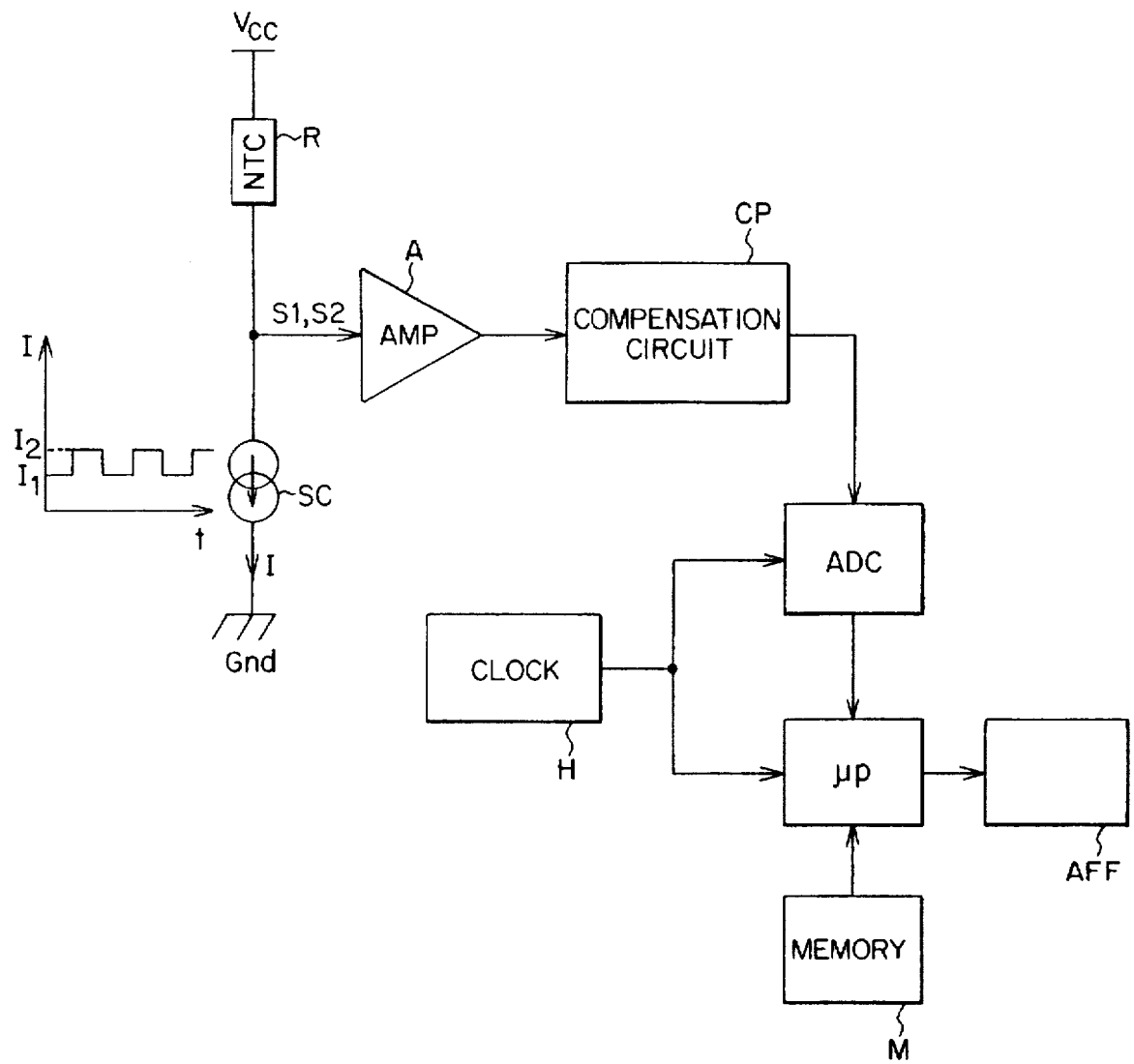
FIG. 1 shows a device that performs a method of measuring a speed of flow of a fluid according to an embodiment of the invention.

FIG. 1 shows a device to implement the method for measuring a speed of flow of a fluid according to an embodiment of the invention. The device has a thermistor R series-connected with a current source SC between a supply terminal Vcc and a ground terminal Gnd. As shown in FIG. 1, the thermistor is an NTC (negative temperature coefficient) type of resistor. This thermistor plays the role of a heat sensor and the value of its resistance varies with the temperature of the sensor. This thermistor is placed on the periphery of the tube and is constantly in contact with the flow of fluid. The current source SC gives a current to the thermistor which then dissipates heat by convection in the fluid. To implement the invention, there is provided a current source whose temporal characteristic is a square-wave function. Consequently, the current coming from the current source SC can assume two distinct values $I_1$ and $I_2$. Thus, the thermistor is used in two distinct types of configuration.

At the midpoint between the thermistor R and the current source SC, two voltage signals S1, S2 are provided. These two voltage signals are characteristic of the state of the thermistor for the two current values $I_1$ and $I_2$. These two signals will constitute the two information elements that are necessary and sufficient to compute the speed of flow of the fluid, assuming that the thermal conductance of the fluid is known. Since these signals are generally weak, they are amplified by means of an amplifier A before being interpreted. It is also possible to envisage filtering them in order to completely eliminate any noises.

A thermal inertia compensation circuit CP is designed to improve the speed of response of the amplifier. This compensation is made necessary by the fact that the thermistor R has a certain degree of thermal inertia and therefore shows a time constant. This circuit, which is well known to those skilled in the art, can be used to determine the final value of the signals S1 and S2 coming from the amplifier.

An analog-digital converter ADC makes available logic states (or signals) representing amplified and corrected signals S1 and S2. According to a preferred embodiment, these logic states are transmitted to a fuzzy logic microprocessor µp. Fuzzy logic makes it possible to set up a perfect model of the system constituted by the tube and the fluid. This microprocessor is designed to implement rules and membership functions that shall be described in detail hereinafter in the description. This microprocessor is, for example, a WARP type microprocessor manufactured by the firm SGS THOMSON MICROELECTRONICS.

There is also provided a program memory M linked to the microprocessor µp to store these rules and these membership functions.

The analog-digital converter ADC and the microprocessor µp have their clock rates set by a clock H. The frequency of the pulses of the clock H is directly linked to the frequency F of the square-wave function generating the currents $I_1$ and $I_2$ that come from the current source SC. In one embodiment of the invention, the clock frequency is twice as high as the frequency F.

Finally, the microprocessor µp is also connected to means AFF for the display of the result. In certain applications, the result is not obligatorily displayed but processed in order to act on another system. For example, in the field of suction of fluids, the microprocessor provides a result signal that is used to act on the power of the motor of the suction system. In this embodiment the value of the result signal coming from the microprocessor µp is then no longer a value of speed of flow but a value of voltage or of current to set the power of the motor.

To implement a method using fuzzy logic, it is necessary to carry out a learning step to set up a model of the system. In a first stage, correspondences are established by direct measurement between the values of the signals S1 and S2 and the desired values of speed of flow. To do so, determined flows of fluid are injected into the tube for the deduction therefrom of the different values of the signals S1 and S2. The values of correspondence obtained are stored in a file. Then, this file is used to prepare membership functions and rules by means of a specific program stored in the program memory M. This program may be, for example, the simulation software AFM designed by the firm SGS THOMSON MICROELECTRONICS. During this learning step, zones are defined in the dynamic range of the signals S1 and S2. As shown by way of example in FIG. 2, five zones have been defined on the dynamic range of the signal S1 which has been standardized beforehand on a scale of 0 to 100: these five zones correspond to the values 0–25, 0–50, 25–75, 50–100 and 75–100. Five membership functions $f_1$, $f_2$, $f_3$, $f_4$ and $f_5$, having a trapezoidal shape, are associated with these five zones. A triangular or Gaussian shape could have been chosen. For each possible value of S1 ranging from 0 to 100, a coefficient of membership of this value in a zone is defined by the shape of the membership function. Thus, the value S1=30 belongs to the second zone with a membership coefficient of 1 and to the third zone with a membership coefficient of 0.30. This value belongs to the other zone with a coefficient 0.

Figures 2, 3:
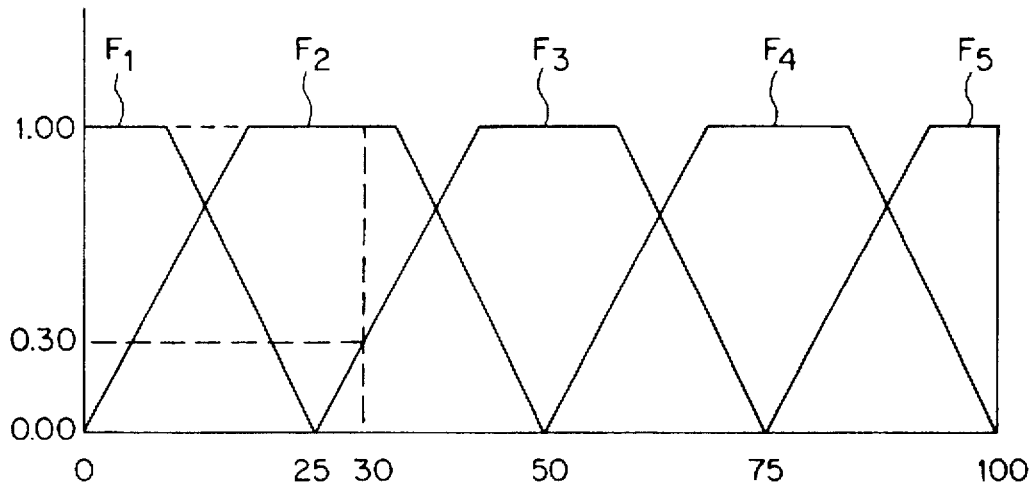
FIG. 2 shows an example of membership functions defined on the dynamic range of a signal coming from the heat sensor.
FIG. 3 shows an example a set of membership rules.

Zones and membership functions $g_1 \ldots g_5$ are defined in the same way on the dynamic range of the signal S2, and a similar procedure is carried out on the dynamic range of a result signal pertaining to the speed of flow of the fluid. Then, rules are established setting up a correlation between the membership of the values of the signals S1, S2 respectively in the zones of the membership functions $f_1 \ldots f_n$ and $g_1 \ldots g_n$ and the membership of the result signal in one of the zones of the result signal. FIG. 3 shows an example of rules. In this example, the signal T is the result signal and the membership functions of the result signal are designated by $h_1 \ldots h_n$. Each rule is a combination of conditions pertaining to the signals S1, S2 and leading to a condition on the result signal. The first rule indicates that if the value of the signal S1 belongs to the zone of the membership function $f_1$ and if the value of the signal S2 belongs to the zone of the membership function $g_1$, then the value of the result signal T belongs to the zone of the membership function $h_1$.

Once the rules and the membership functions have been established, a provisional result value is computed. To this end, a method referred to as the method of the minimum is used. This method shall be described with respect to an example implementing the signals S1, S2 and the result signal T. It may be recalled that, since the shape of the membership function is trapezoidal, each value of a signal belongs to two ranges at a time. Following the determining of the membership functions and the rules, it is possible to have:

S1 belongs to $f_i$ with a coefficient of 0.45

S1 belongs to $f_{i+1}$, with a coefficient of 0.65

S2 belongs to $g_i$ with a coefficient of 1

S2 belongs to $g_{i+1}$ with a coefficient of 0.14

All the coefficients are zero in the other zones. From all the rules, the rules relating solely to the membership functions $f_i, f_{i+1}, g_i$ and $g_{i+1}$ are extracted. For example, there will be the following rules:

if S1 belongs to $f_i$ and S2 belongs to $g_i$, then T belongs to $h_j$;

if S1 belongs to $f_i$ and S2 belongs to $g_{i+1}$, then T belongs to $h_j$;

if S1 belongs to $f_{i+1}$ and S2 belongs to $g_i$, then T belongs to $h_k$;

if S1 belongs to $f_{i+1}$ and S2 belongs to $g_{i+1}$, then T belongs to $h_k$.

The method of the minimum includes stating that, for each rule, the result signal T belongs to the zone indicated in this rule with a membership coefficient equal to the minimum of the coefficients of the signals S1 and S2 of the rule. In the case of the first rule, the value of the result signal T is 0.45 times the mean value of the zone $h_j$. In the case of the second rule, the value of the result signal T is 0.14 times the mean value of the zone $h_j$ and so on and so forth.

To obtain the provisional result value, the mean of the results of the rules taken into account is calculated. In the present example, the value obtained is:

$$T=(0.45h_j+0.14h_j+0.65h_k+0.14h_k)/4$$

This computed provisional value is then compared with the desired result value. If the difference between these two values is excessive, which is generally the case in the first computation, the number and shape of the membership functions of the result signal as well as the number and contents of the rules are refined so that the difference between these two values may be below a certain threshold. At the end of this step, a comprehensive modelling of the system is obtained.

Once the learning stage is performed with the normal conditions of use, the fuzzy logic microprocessor μp is capable of computing the speed of flow of a fluid on the basis of the signals S1 and S2 coming from the heat sensor. It uses the membership functions set up during the learning stage in order to determine the coefficients of membership of the signals S1 and S2 in the zones of these functions. Finally, it applies the method of the minimum in taking account of the pre-established rules to compute the result value corresponding to the speed of flow of the fluid.

This method of measuring the speed of flow of a fluid may be used to measure the flow rate of air in ventilation ducts. This method could also be used to automatically regulate the flow rate of air in suction or air-conditioning systems.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method for measuring a speed of flow of a fluid by means of a heat sensor placed in the flow of the fluid, the heat sensor being crossed by current that carries the heat sensor to a temperature greater than a temperature of the fluid, the method comprising the steps of:

extracting a first signal from the heat sensor, the first signal representing an exchange of heat between the heat sensor and the fluid for a first value of current flowing through the heat sensor;

making the current flowing through the sensor vary from the first value to a second value;

extracting a second signal from the heat sensor, the second signal representing an exchange of heat between the heat sensor and the fluid for the second value of current flowing through the heat sensor; and determining, using fuzzy logic, the speed of flow of the fluid based on the first and second signals.

2. The method of claim 1, wherein the fluid is a gas, and wherein the heat sensor is a platinum wire with a diameter of 0.6 to 10 micrometers.

3. The method of claim 1, wherein the fluid is a liquid, and wherein the heat sensor is a thin film of platinum placed on one of an insulating cone and a cylinder.

4. The method of claim 1, wherein, to determine the speed of flow of the fluid, the following steps are performed:

a first set and a second set of membership functions are defined on a dynamic range between the first and second signals by determining, for each membership function, a zone of this dynamic range and a coefficient of membership of each value of the first and second signals in this zone;

membership functions of a result signal corresponding to the speed of flow of the fluid are determined with, for each membership function of the result signal, a zone of the dynamic range of the result signal and a coefficient of membership of each value of the result signal in the zone of the dynamic range of the result signal;

rules are established setting up a correlation between, on one hand, the membership values of the first and second signal respectively in zones of the first and second set of membership functions and, on the other hand, the membership of the result signal in zones the result signal; and for each rule, a membership value is computed, the membership value is multiplied by a mean value of the zone of the membership function of the result signal corresponding to this rule, and a mean of the results of this multiplication is taken to produce the value of the speed of flow of the fluid.

5. The method of claim 4, wherein the membership value is computed by a choice, in each rule, of the minimum of the membership coefficients of the first and second signals.

6. The method of claim 1, further comprising a step of using the determined speed of flow of the fluid for automatic regulation of a suction of the fluid.

7. An apparatus for measuring a speed of a fluid, comprising:
- a heat sensor that makes contact with the fluid, the heat sensor having a first end coupled to a first supply terminal, and a second end coupled to a node;
- a current source having a first end coupled to the node, a second end coupled to a second supply terminal, and an input;
- a control circuit having an output coupled to the input of the current source, wherein the output of the control circuit provides a control signal to the input of the current source to vary a current of the current source from a first value to a second value; and
- a microprocessor, including a fuzzy logic circuit that operates according to membership functions and fuzzy logic rules, having an input coupled to the node, and an output that provides a result signal indicative of the speed of the fluid, wherein the input of the microprocessor receives a first signal and a second signal from the node when the current of the current source has the first value and the second value, respectively, and wherein the result signal is based on the first and second signals.

8. The apparatus of claim 7, wherein the heat sensor includes exactly one thermistor having a surface that makes contact with the fluid, and a resistance that varies based on temperature.

9. The apparatus of claim 7, wherein the heat sensor is raised to a temperature that is greater than a temperature of the fluid in response to each of the first and second values of current, and wherein the first and second signals represent first and second rates of heat exchange between the heat sensor and the fluid, respectively.

10. The apparatus of claim 7, wherein the heat sensor is attachable to a periphery of a tube; and wherein the fuzzy logic circuit is programmed based on:
- injection of a plurality of known flows through the tube when the heat sensor is attached to the tube;
- for each known flow that is injected through the tube, measurement of the first and second signals while the first and second values of current are respectively applied to the heat sensor; and calibration of the fuzzy logic circuit such that values of the result signal are indicative of corresponding values of the plurality of known flows injected through the tube.

11. The apparatus of claim 7, wherein the fuzzy logic circuit operates according to a first set of membership functions for the first signal, a second set of membership functions for the second signal, a third set of membership functions for the result signal, and fuzzy logic rules correlating the sets of membership functions such that the result signal is indicative of the speed of the fluid.

12. A method for measuring a speed of fluid, comprising the steps of:

measuring a first signal from a heat sensor when a current flowing through the heat sensor has a first value;
varying the current from the first value to a second value;
measuring a second signal from the heat sensor when the current flowing through the heat sensor has the second value; and
determining, using fuzzy logic rules, the speed of the fluid according to the measured first signal and the measured second signal.

13. The method of claim 12, wherein the heat sensor includes exactly one thermistor having a surface that makes contact with the fluid, and a resistance that varies based on temperature, and wherein each step of measuring includes a step of receiving a signal from the exactly one thermistor.

14. The method of claim 12, wherein the heat sensor is raised to a temperature that is greater than a temperature of the fluid in response to each of the first and second values of current, and wherein the first and second signals represent first and second rates of heat exchange between the heat sensor and the fluid, respectively, and wherein the step of determining includes a step of deducing the speed of the fluid based on the first and second rates.

15. The method of claim 12, wherein the step of determining includes a step of providing the measured first signal and the measured second signal to a fuzzy logic circuit that operates according to membership functions and fuzzy logic rules, and obtaining, from the fuzzy logic circuit, a result signal indicative of the speed of the fluid.

16. The method of claim 15, wherein the heat sensor is attachable to a periphery of a tube, and wherein the method further comprises a step of programming the fuzzy logic circuit by:
- injecting a plurality of known flows through the tube when the heat sensor is attached to the tube;
- for each known flow that is injected through the tube, measuring the first and second signals while the first and second values of current are respectively applied to the heat sensor; and
- calibrating the fuzzy logic circuit such that values of the result signal are indicative of corresponding values of the plurality of known flows injected through the tube.

17. The method of claim 16, wherein the step of calibrating the fuzzy logic circuit includes the steps of:
- obtaining, from the fuzzy logic circuit, the result signal in response to a test flow;
- comparing a value of the result signal to an expected value corresponding to the test flow; and
- refining membership functions and rules of the fuzzy logic circuit when a difference between the value of the result signal and the expected value exceeds a predetermined threshold.

18. An apparatus for measuring a speed of a fluid, comprising:
- first measuring means for measuring a first signal from a heat sensor when a current flowing through the heat sensor has a first value;
- means for varying the current from the first value to a second value;
- second measuring means for measuring a second signal from the heat sensor when the current flowing through the heat sensor has the second value; and
- means for determining using membership functions and fuzzy logic rules, the speed of the fluid according to the measured first signal and the measured second signal.

19. The apparatus of claim 18, wherein the heat sensor includes exactly one thermistor having a surface that makes contact with the fluid, and a resistance that varies based on temperature, and wherein each of the first and second measuring means includes means for receiving a signal from the exactly one thermistor.

20. The apparatus of claim 18, wherein the heat sensor is raised to a temperature that is greater than a temperature of the fluid in response to each of the first and second values of current, and wherein the first and second signals represent first and second rates of heat exchange between the heat sensor and the fluid, respectively, and the means for determining includes means for deducing the speed of the fluid based on the first and second rates.

21. The apparatus of claim 18, wherein the means for determining includes means for providing the measured first signal and the measured second signal to a fuzzy logic circuit that operates according to membership functions and fuzzy logic rules, and obtaining, from the fuzzy logic circuit, a result signal indicative of the speed of the fluid.

22. The apparatus of claim 21, wherein the heat sensor is attachable to a periphery of a tube, and wherein the apparatus further comprises means for programming the fuzzy logic circuit having:

means for injecting a plurality of known flows through the tube when the heat sensor is attached to the tube;

third measuring means for measuring, for each known flow that is injected through the tube, the first and second signals while the first and second values of current are respectively applied to the heat sensor; and means for calibrating the fuzzy logic circuit such that values of the result signal are indicative of corresponding values of the plurality of known flows injected through the tube.

23. The apparatus of claim 22, wherein the means for calibrating the fuzzy logic circuit includes:

means for obtaining, from the fuzzy logic circuit, the result signal in response to a test flow;

means for comparing a value of the result signal to an expected value corresponding to the test flow; and means for refining membership functions and rules of the fuzzy logic circuit when a difference between the value of the result signal and the expected value exceeds a predetermined threshold.

* * * * *